United States Patent [19]

Shobatake

[11] Patent Number: 5,164,939

[45] Date of Patent: Nov. 17, 1992

[54] PACKET SWITCHING DEVICE

[75] Inventor: Yasuro Shobatake, Yokohama, Japan

[73] Assignee: Kabushiki Kaisha Toshiba, Kawasaki, Japan

[21] Appl. No.: 703,050

[22] Filed: May 17, 1991

Related U.S. Application Data

[63] Continuation of Ser. No. 325,323, Mar. 17, 1989, abandoned.

[30] Foreign Application Priority Data

Mar. 17, 1988 [JP] Japan .................................. 63-64056
Mar. 23, 1988 [JP] Japan .................................. 63-67106

[51] Int. Cl.⁵ .......................... H04J 3/14; H04J 3/16; H04L 12/56
[52] U.S. Cl. ...................................... 370/60; 370/94.1
[58] Field of Search ........................ 370/60, 94.1, 60.1

[56] References Cited

U.S. PATENT DOCUMENTS

| | | | |
|---|---|---|---|
| 4,491,945 | 1/1985 | Turner | 370/60 |
| 4,646,294 | 2/1967 | Eliscu et al. | 370/60 |
| 4,730,305 | 3/1988 | Acampora et al. | 370/60 |
| 4,761,780 | 8/1988 | Bingham et al. | 370/94.1 |
| 4,797,880 | 1/1989 | Bussey, Jr. et al. | 370/94.1 |
| 4,821,258 | 4/1989 | Fraser | 370/60 |
| 4,849,968 | 7/1989 | Turner | 370/60 |
| 4,922,488 | 5/1990 | Niestegge | 370/60 |
| 4,964,119 | 10/1990 | Endo et al. | 370/60 |

FOREIGN PATENT DOCUMENTS 62-260452 11/1987 Japan .

OTHER PUBLICATIONS (Conference Proceedings) 10th Annual International Symposium on Computer Architecture; Kumar et al., Switching Strategies in a Class of Packet Switching Networks; (1983) pp. 2-4, p. 284.
NEC Research and Development No. 87, Noguchi et al., Development of High-speed Packet Switching System (1987) p. 51, paragraphs 2 and 3.
Journal of Parallel and Distributed Computing, vol. 1, No. 1; Kumar et al., Performance Enhancement in Buffered Delta Networks Using Crossbar Switches and Multiple Links; (1984) p. 90, line 1 to p. 91, line 26.
(Conference Proceedings) 15th Annual International Symposium on Computer Architecture, Tamir et al., High Performance Multi-Queue Buffers for VLSI Communication Switches; III; FIGS. 1, 2.
Dias et al., "Design and Analysis of a Multistage Voice-Data Switch", IEEE, 1987, pp. 1856-1860.

*Primary Examiner*—Douglas W. Olms
*Assistant Examiner*—Min Jung
*Attorney, Agent, or Firm*—Foley & Lardner

[57] ABSTRACT

The present invention discloses a packet switching device which transmits a data packet transmitted from a plurality of input communication channels to a plurality of output communication channels. This switching device comprises a switch which continuously switches between the communication means, a buffer which stores the data packets transmitted from the input communication channels, then transmits the stored packets in sequence to the switch, a detection means which detects the packet transmission status from the buffer to the switch, and a transmission control means which controls the transmission status from the buffer to the switch so that a packet is selected, among the packets stored in the buffer, to be transmitted in order to reduce the number of the output communication channels to which no packet has been designated yet. Very high throughput can be obtained by this device.

20 Claims, 11 Drawing Sheets

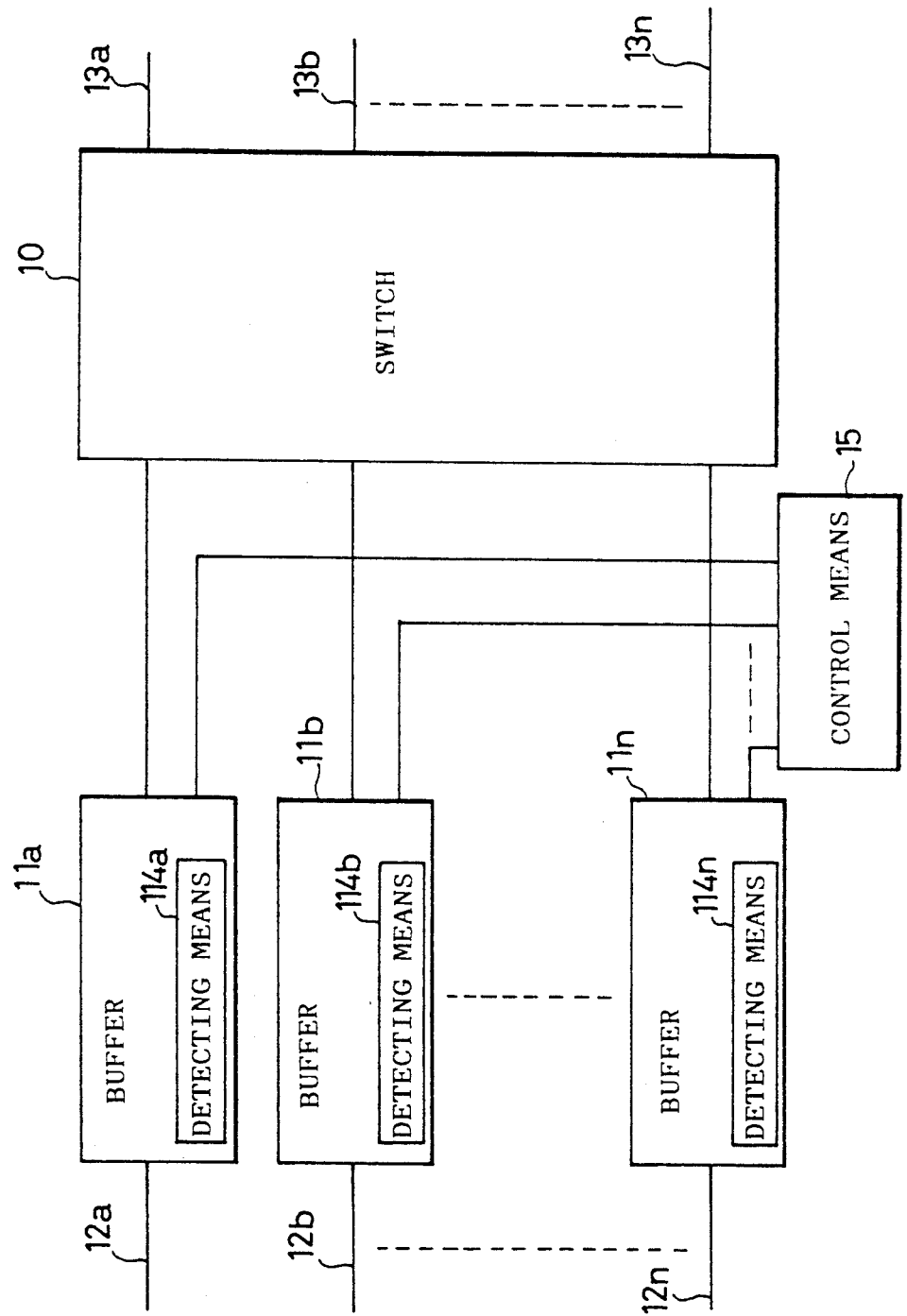

FIG.5

| STATUS OF BUFFER B | STATUS BUFFER A | | |
|---|---|---|---|
| | (1) | (2) | (3) |
| (1) | I | II | IV |
| (2) | II | I | IV |
| (3) | III | III | V |

FIG.6

| n | 1 | 2 | 4 | 8 | 16 |
|---|---|---|---|---|---|
| P0([0,0]) | 0.25 | 0.125 | $0.625 \times 10^{-1}$ | $0.313 \times 10^{-1}$ | $0.157 \times 10^{-1}$ |

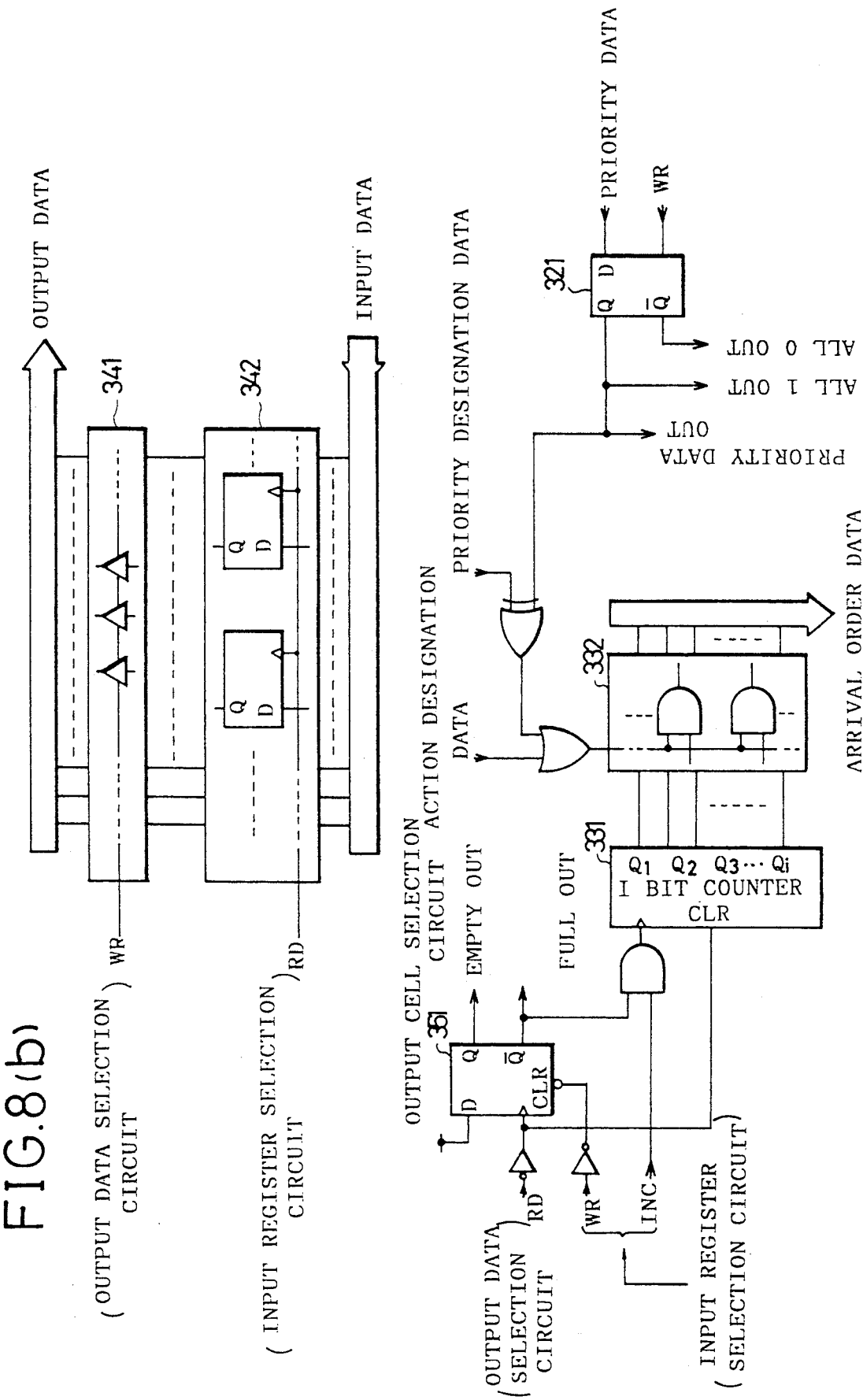

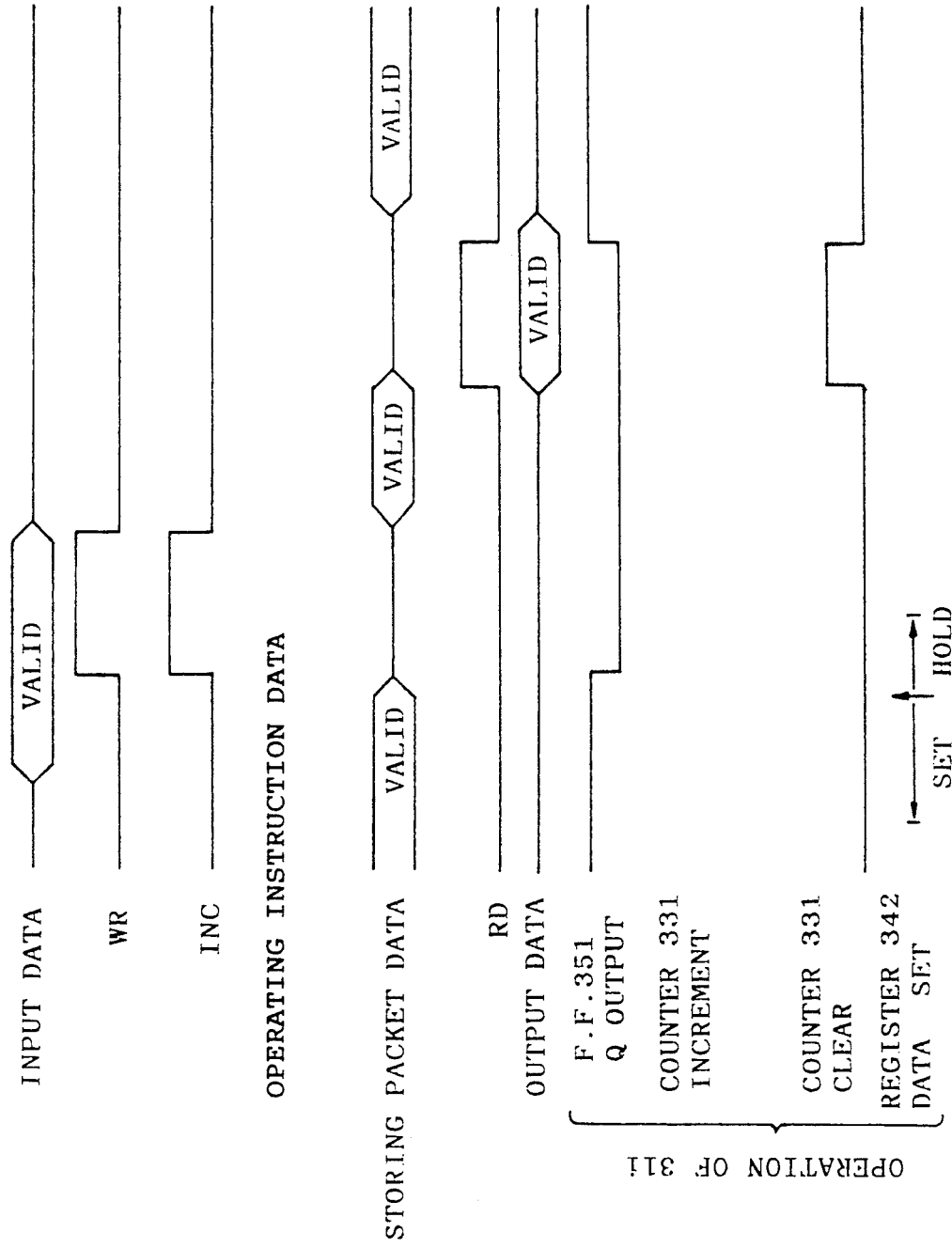

PACKET SWITCHING DEVICE

This application is a continuation of application Ser. No. 07/325,323, filed Mar. 17, 1989, now abandoned.

BACKGROUND OF THE INVENTION

1. Field of the Invention

The present invention relates to a packet switching device for packet communication, and, in particular, to a packet switching device which transmits a packet from one communication channel to another communication channel.

2. Description of the Prior Art

In order to transmit data, wide use has been made of a packet communication system in which the data is divided into sections of a certain size, these sections are bundled, and packets to which are affixed the destination address are generated. The communication system then determines the route of the packet by which the packet will be transmitted while making reference to the destination address. It is possible for many more users to utilize the capabilities of a packet communication system at the same time for the communication of useful data only because the destination address is attached to the data. It has the advantage that it is possible to improve the communication efficiency and reduce communication costs.

In order to widen the sphere of use of the package communication system, it is indispensable to construct a hardware packet switching device which can transmit, without the aid of computer program, a number of packets input from an input communication channel to an output communication channel which indicates routing data of these packets, as described in U.S. Pat. No. 4,491,945. One commonly known method of realizing this packet switching device comprises a means wherein a switch is provided which can accommodate a plurality of both input and output communication channels; in each input communication channel a buffer temporarily stores a packet from an input communication channel corresponding to that input communication channel; the switch analyses the route data for the lead packet from the oldest among the packets which are stored in the buffers provided in each input communication channel and determines the output communication channel for transmitting the packet; and a means for transmitting the lead packet to the intended output communication channel.

FIG. 1(A) is a block diagram showing this type of a conventional packet switching device.

This diagram shows a switch 10 which transmits an input packet to an, output communication channel which indicates the routing data which the packet contains; a plurality of input communication channels 12a, 12b, 12c . . . 12n which input the packet to a buffer; a plurality of buffers 11a, 11b . . . 11n provided to correspond to the above input communication channels; and a plurality of output communication channels 13a, 13b, . . . 13n which output the packets from the switch.

In the conventional system shown in FIG. 1(A), the switch analyses the routing data for the head packet in each buffer, and transmits the packet in an output communication channel which shows the channel data from a certain input communication channel.

However, with this method, in the case where the head packets of a plurality of buffers are supposed to be output in the same output communication channel, specifically, in the case where packet collisions occur, one of those packets is selected and the remaining packets are not transmitted from the buffers. For this reason, packet collisions is a cause of reduction of the throughput of the buffers, and in addition causes a decrease in the throughput of the packet switching device. Here, throughput is defined as the ratio of the actual number of packets transmitted in a certain time interval to the maximum number of packets which can be transmitted in that time interval.

In the case where the output communication channel facing a packet positioned on the input communication channel is randomly determined, when using the conventional technology described above, the throughput of a 2×2 packet switching device which accomodates two input communication channels and two output communication channels is a maximum of 0.75 for one output communication channel, according to such references as "IEEE transactions on Computers" volume C-30, No. 4, pages 273 to 282, April 1981 by D. M. Dias and J. M. Jump "Analysis and Simulation of Buffered Delta Network." For an input communication channel, when offered load is greater than the throughput of the output communication channel buffer overflows occurs, and the number of discarded packets increase. Packet discard has a bad influence on data communication so that with packet switching devices using existing technology there is the drawback that offered loads cannot be high to the number of communication channels. In the abovementioned 2×2 packet switching device, when offered load becomes 0.75 or greater on that input communication channel, the number of discarded packets is increased and it is impossible to maintain adequate characteristics as a packet switching device. Here, load is defined as the ratio of the actual number of packets inputted in a given time interval to the maximum number of packets which can be input in that time interval.

As outlined above, because considerable packet discard is occured as a result of the inadequacy of the throughput of a buffer attributable to packet collision, the drawback occurs in which the conventional packet switching system or device cannot be used in the status in which a offered load is high to the number of communication channel.

SUMMARY OF THE INVENTION

An object of the present invention is to provide a packet switching device which, without the aid of software, transmits a packet between communication channels at a high throughput.

Another object of the present invention is to provide a buffer which is suitable in the above mentioned packet switching device.

These objects are achieved in the present invention by the provision of a packet switching device wherein a plurality of packets to which routing data is attached are input from a plurality of input communication channels, output communication channels for outputting, corresponding to the routing data are selected, and the packets are output to the selected output communication channel in spite of arrival order of these packets.

A packet switching device having a plurality of input communication channels and a plurality of output communication channels for transmitting a packet from the input communication channels to the output communication channels in accordance with a route data in the packet, comprising:

(a) buffers provided in correspondence to the input communication channels for temporarily storing the packet transmitted from the input communication channels, for displaying buffer status data obtained by a predetermined means in accordance with a combination of the route data in the stored packet, and for outputting the packet the output communication channel of which is allocated by an indication;

(b) switch for loading the packet from said buffers to the designated output communication channel; and (c) transmission control means for receiving the buffer status data displayed by said buffers and for indicating to each of said buffer an allocation of the output communication channels for said buffers to be determined by the combination of the buffer status data from each of said buffers.

By means of the present invention, it becomes possible to select a packet transmitted to the switching means from the packet storage means in order to avoid an output communication channel which is assigned no packet to be transmitted therein at any time. For this reason, because there is a reduced probability of a packet not being output in an output communication channel connected to a packet switching machine the throughput of the packet switching machine can be equally upgraded. Accordingly, even when an offered load is high on the input communication channel, the packet discard ratio does not worsen, and it is therefore possible to provide a packet switching system in which it is possible to add a high load to a communication channel.

BRIEF DESCRIPTION OF THE DRAWINGS

FIG. 2 is a block diagram showing one embodiment of the present invention.

FIG. 5 is a diagram showing the transmission control method of the embodiment of the present invention shown in FIG. 4.

FIG. 6 is a diagram showing a specific value of the lower limit of the probability of the output communication channel of the embodiment shown in FIG. 4 not being used.

FIG. 8(a) to FIG. 8(e) are block diagrams and charts explaining the buffer device of the present invention.

DESCRIPTION OF THE PREFERRED EMBODIMENTS

Figure 1A:
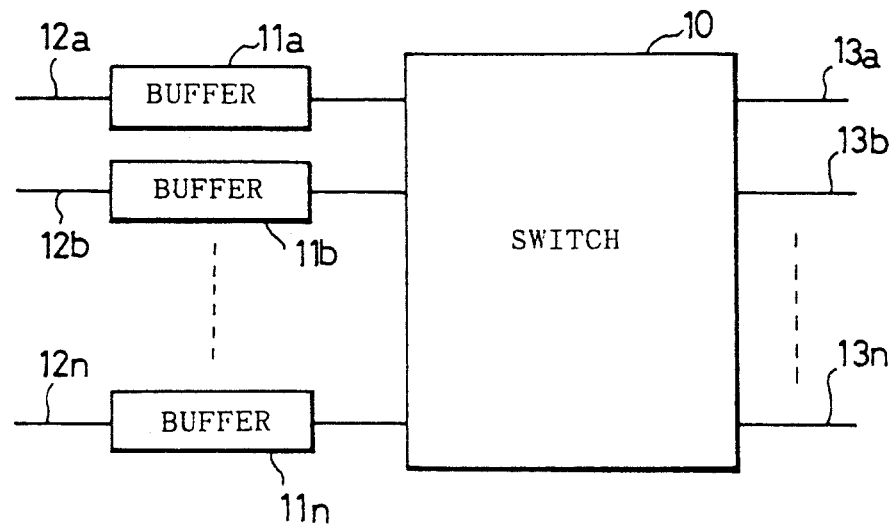
FIG. 1(A) is a block diagram showing a conventional packet switching device.

FIG. 2 is a block diagram showing one embodiment of the present invention. This diagram shows a switch 10 which transmits an input packet to an output communication channel which indicates the routing data which the packet contains; a plurality of input communication channels 12a, 12b, ... 12n which input the packet to a switch; a plurality of buffers 11a, 11b ... 11n which are packet storage means provided to correspond to the above input communication channels; a plurality of output communication channels 13a, 13b, ... 13n which output the packets from a switch which is switching means; a control means 15 which detects the packet forwarding status with respect to the output communication channel and transmits that packet forwarding status to the packet storage means; and a plurality of detection means 114a, 114b ..., 114n which detect the packet to be forwarded to the switching means, based on the packet forwarding status.

Next, FIG. 2 is a block diagram showing one embodiment of the present invention which explains the action of that embodiment.

A packet for switching is transmitted to the input communication channel. This packet is temporarily stored in a packet storage means of a buffer provided for an individual input communication channel.

The control means detects the packet forwarding status and inputs this packet forwarding status to the buffer.

This buffer analyzes the packet forwarding status and determines the idle output communication channels. Then the detection means in the buffer searches for a packet opposite an idle output communication channel, beginning with the packet which it is storing itself, and outputs any such packets to the switch. The switch receives the packets from the buffer, analyzes the routing data in the received packets, determines which output communication channel will transmit those packets, and transmits them.

By this means, it is possible to lower the probability of a packet not being output to the output communication channel. Thus the throughput of the packet switch can be improved.

Figure 3:
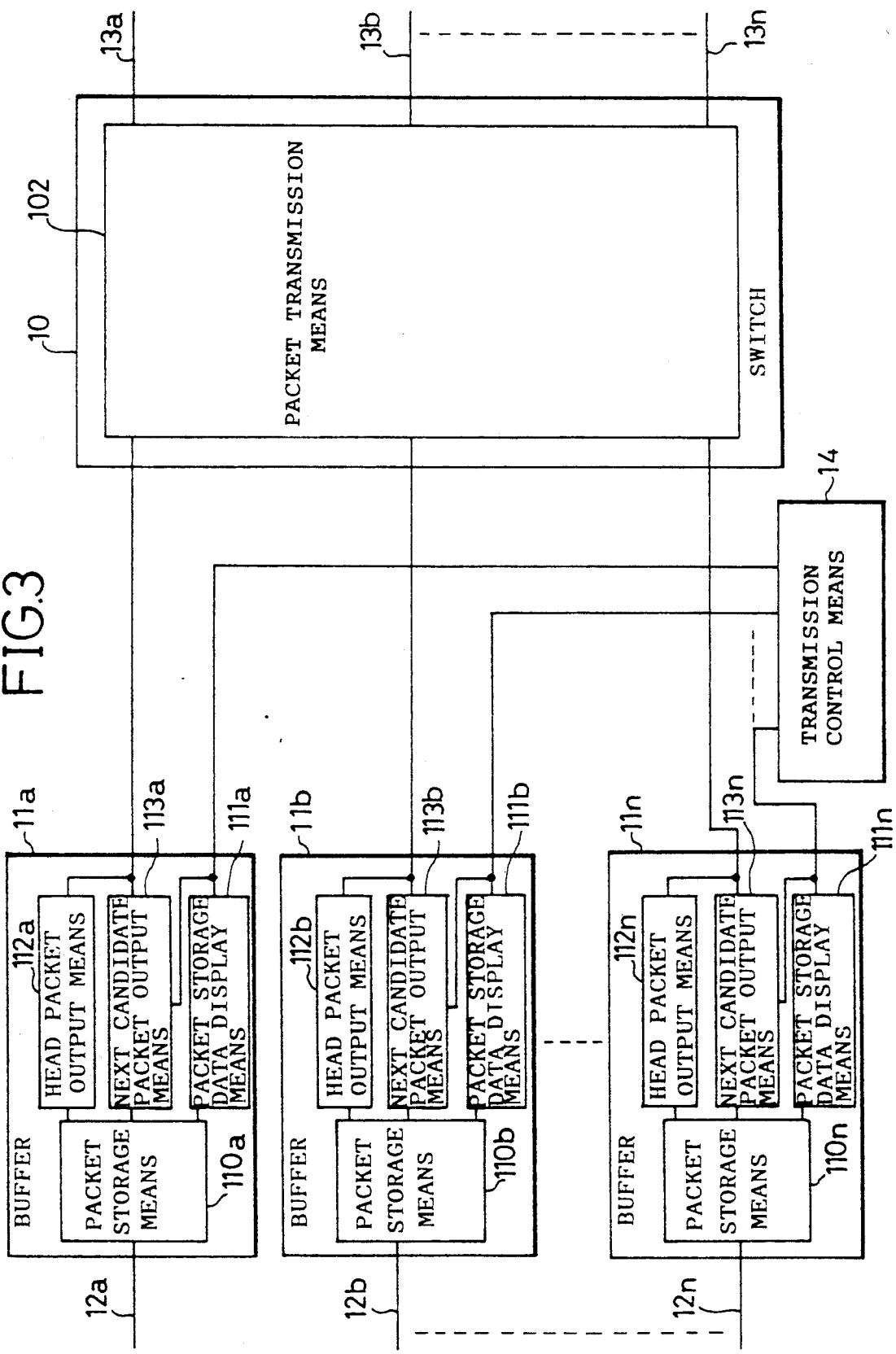
FIG. 3 is a block diagram showing another embodiment of the present invention.

Next, FIG. 3 is a block diagram showing another embodiment of the present invention. This embodiment will now be explained with reference to the diagram.

In the embodiment shown in this diagram, in place of the control means, a transmission control means is provided which reports the transmission control data to the buffer. In addition, in the embodiment shown in FIG. 3, the buffer comprises, for example, the following four types of means.

(1) A packet storage means which temporarily stores a packet along with data which indicates the order in which packets are received and appear on certain input communication channels.

(2) A packet storage data display means which displays packet storage data of the status determined by the packet stored by the packet storage means.

(3) A head packet output means which outputs the head packet, which is the oldest packet stored of the packets in the packet storage means.

(4) A next candidate packet output means, which outputs the next candidate packet which is the oldest packet stored among the packets which satisfy the conditions for selection indicated from external sources for the packets stored in the packet storage means.

In addition, the transmission control data which the transmission control means reports to the buffer comprises the data for selecting either the head packet output means or the next candidate packet output means for the respective buffers, and the selection conditions used for the next candidate packet output means when the next candidate packet output means is selected. The transmission control data is drawn up with reference to the packet storage data for a plurality of packets displayed by the packet storage data display means. A transmission control means such as shown in FIG. 3 can take into account data from another independently constructed switching control means block, as well as data contained in the transmission control means or that contained in another block.

In addition, the switch receives the packet which is output by the head packet output means selected by the transmission control means, or output by the next candidate packet output means, and determines the output communication channel by which that packet is transmitted from among the output communication channels which are accommodated, utilizing the routing data on the packet. A packet transmission means is provided for transmission.

Shown in FIG. 3 are the following components. They are described with reference to the diagram. A switch 10 transmits the input packet to the output communication channel indicated by the routing data on the packet. A plurality of input communication channels 12a, 12b, ... 12n, input the packet to the switch. A plurality of buffers 11a, 11b ... 11n are provided, corresponding to each of the input communication channels. A plurality of output communication channels 13a, 13b, ... 13n, output the packet from the switch. A plurality of packet storage means 110a, 110b, ... 110n store data showing the order in which packets are received from certain input communication channels and appear on the input communication channels, and temporarily store the packets. A plurality of packet storage data display means 111a, 111b, ... 111n display packet storage data which has a status determined by the packets which are stored by the packet storage means. A plurality of head packet output means 112a, 112b, ... 112n output the head packets which are the oldest packets stored by the packer storage means. A plurality of next candidate packet output means 113a, 113b ... 113n output the next candidate packets which satisfy the selection condition indicated from external sources for the packets stored in the packet storage means. A transmission control means 14 receives a plurality of items of packet storage data displayed by the packet storage data display means, selects either the head packet output means or the next candidate packet output means for the respective buffers from the packet storage data received, and reports the selection conditions used for the next candidate packet output means when the next candidate packet output means is selected. A packet transmission means 102 receives the packet output by the head packet output means or the next candidate packet output means selected by the transmission control means, determines the output communication channel for transmitting the packet from among the output communication channels accommodated in the switch by means of the routing data attached to the packet, and transmits the packet.

Next, the action of the embodiment shown in FIG. 3 will be explained.

A packet to be switched is transported to an input communication channel, and this packet is stored temporarily in the buffer for the packet storage means provided to correspond with each input communication channel.

The packet storage data display means in the respective buffers analyze the packets stored in the packet storage means, create the packet storage data, and display it on the transmission control means. The transmission control means selects either the head packet output means or the next candidate packet output means as the means to be used when outputting the packets in the respective buffers based on the packet storage data received, and reports the respective buffers. When the next candidate packet output means is selected for the buffer, the transmission control means also reports the selection conditions used when selecting a packet for outputting by the next candidate packet output means.

The packet transmission means receives the packet taken out of the packet storage means, selected from among the head packet output means or the next candidate packet output means, and also analyzes the routing data received with the packet, decides the output communication channel by which the packets are to be transmitted, and carries out the transmission.

The selection of output packets made by the transmission control means in accordance with the present invention can be carried out during the transmission of packets which have been already assigned to particular output communication channels. In other words, it is possible to carry out the output packet selection by the transmission control means and the packet transmission by the packet transmission means at the same time in a pipeline manner. By virtue of this pipelining, if all the packets treated by the present embodiment have a same length, a packet can be transmitted immediately into an idle output communication channel in the same manner as the embodiment shown in FIG. 2 can.

The transmission control means selects either the head packet output means or the next candidate packet output means in the respective buffers, and also considers the means for determining the selection conditions when selecting the necessary packet with the next candidate packet output means in the case where the next candidate packet output means is selected. Specifically, it considers the three means which will be discussed next, as buffer control means.

The first means is a means which is constructed based on the following concept.

When all the head packets with buffers are transferred into the switch, the transmission control means analyzes the head packets which cause packet collisions, using the packet storage data. The buffers with head packets which cause packet collisions are collected in each output communication channel opposite a head packet. One of the collected buffers is selected and the head packet related to the selected buffer is transferred to the switch. For the buffers which were not selected, packets opposite the idle output communication channels at that time are selected from among the packets which are stored in the packet storage means. Which of the packets opposite the idle output communication channels is to be selected is reported by the next candidate packet output means as the transmission control means selection conditions.

An algorithm was drawn up based on the concept outlined above, with the following results.

The packet storage data shown by the packet storage data display means is made up of "empty data" which shows whether or not the packet storage means is storing a packet, and all or part of the routing data of the head packet if the packet storage means is storing a packet. The transmission control means analyzes the packet storage data received, and divides them into Group A which contains buffers in which packets are stored; Group B which contains buffers belonging to Group A such that the head packets of these buffers don't cause pack collisions; and Group C which contains buffers belonging to Group A such that the head packets of these buffers do cause packet collisions. In the buffers belonging to Group B, the head packet output means is selected as the means for outputting the packets. In the buffers belonging to Group C, the head packets of the buffers belonging to group C further divide Group C into a plurality of groups opposite each output communication channel. With an optional group of the new groups into which Group C is divided, one buffer is selected from among the buffers belonging to this group, and for this selected buffer the head packet output means is selected as the means for outputting the packet. For the buffers which are not selected, the next candidate packet output means is selected as the means for outputting the packet. Furthermore, as the selection conditions shown in the next candidate packet output means, the necessary packet routing data is used for transmission to the idle output communication channel.

When there is no packet to satisfy the conditions for selection in the buffer selected by the next candidate packet output means, it is possible to obtain the routing data for the necessary packet as new selection conditions to transmit to another idle output communication channel.

The construction of the second means for controlling the buffer is based on the following concept.

The transmission control means indicates the routing data attached to the packets as selection conditions to be output for the respective buffers. The indicated routing data is selected so that no packet collisions occur in the switch. If a certain buffer is not storing the packet with the indicated routing data, the new routing data for the packets for the idle output communication channels at that time is indicated at the transmission control means buffer.

An algorithm was drawn up based on the concept outlined above, with the following results.

The packet storage data shown by the packet storage data display means is made up empty data which shows whether or not the packet storage means is storing a packet, and "hit data" which shows whether or not the packet which is selected by the next candidate packet output means using data shown externally is stored by the packet storage means. The transmission control means analyzes the packet storage data received and the next candidate packet output means is selected as the means for outputting the packets at the respective buffers which are storing packets. In addition, the necessary packet routing data is shown as selection conditions, to be transmitted to an output communication channel which differs with respect to the various buffers in the next candidate packet output means. After the completion of the retrieval of the packet which satisfies the selection conditions carried out by the buffer, the transmission control means further receives the packet storage data and analyzes it, and if it is shown by the hit data that the packet selected by the next candidate packet selection means does not exist, the necessary packet routing data is displayed for transmission to the idle output communication channel at that time as selection conditions newly shown on the next candidate packet output means.

The construction of the third means of controlling the buffer is based on the following concept.

The buffer, by matching the output communication channel for the packet stored in that buffer, indicates the decided buffer status data to the transmission control means. The transmission control means is determined by matching the received buffer status data, and has a table which contains the allotment for the output communication channel least likely to produce packet collisions. The head packet output means or the next candidate packet output means for the various buffers is selected with reference to that table. In addition, the selection conditions given to the next candidate packet output means are determined.

An algorithm was drawn up based on the concept outlined above, with the following results.

The packet storage data shown by the packet storage data display means is made up of empty data which shows whether or not the packet storage means is storing a packet, and buffer status data which indicates the matching output communication channel for the packets, if the packet storage means is storing packets. The transmission control means analyzes the packet storage data received, then the head packet output means or the next candidate packet output means selects the respective buffers by matching with a plurality of buffer status data items. In addition, the necessary packet routing data is shown as selection conditions to be transmitted to an output communication channel decided by matching the buffer status data with the buffer selected by the next candidate packet output means.

Figure 4:
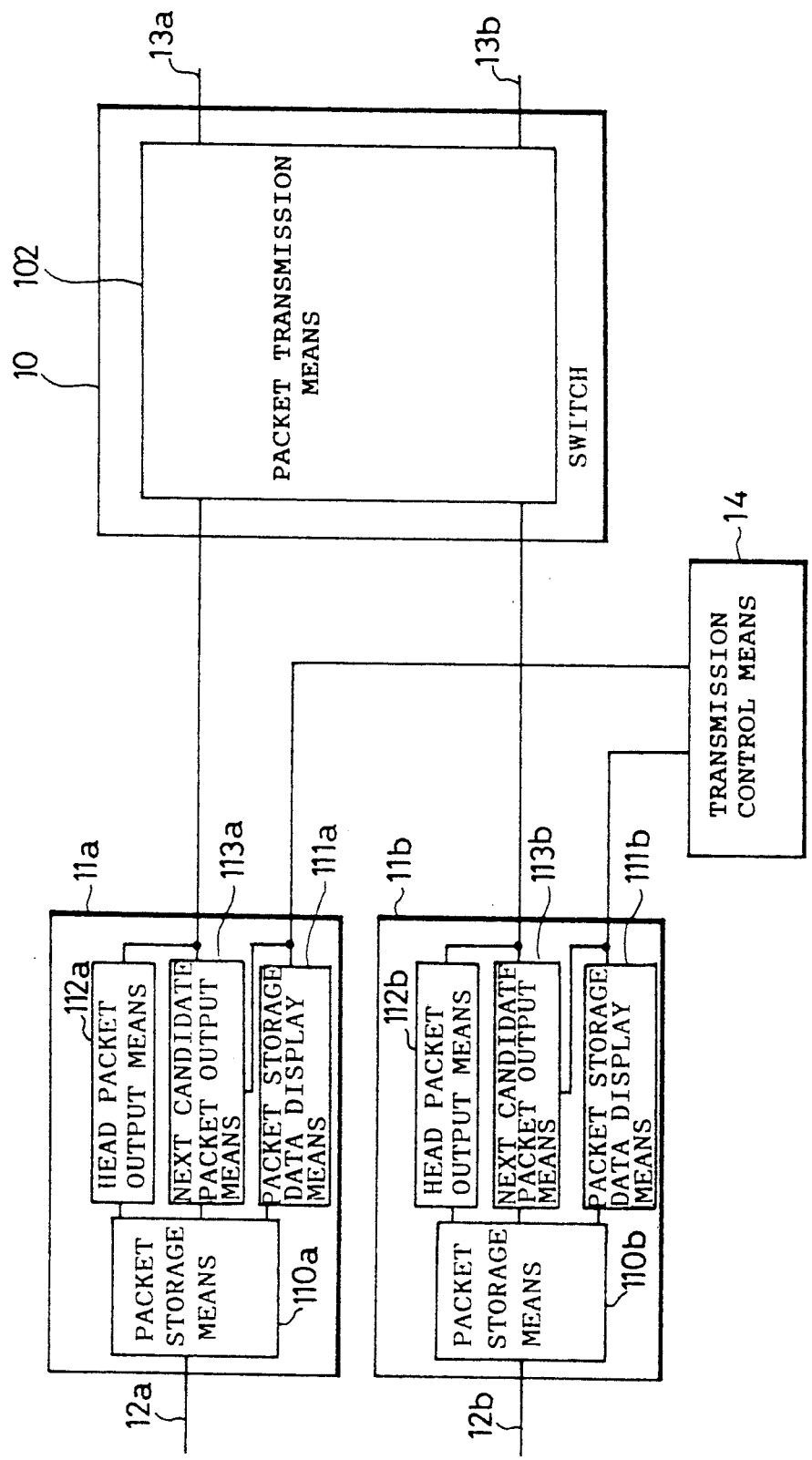
FIG. 4 is a block diagram showing a special case of the embodiment of the present invention shown in FIG. 3.

FIG. 4 shows one embodiment of the present invention in which two input communication channels and two output communcation channels are accommodated to provide a packet switching device in which the buffer control method can be simplified.

The following relates to the changes which occur in one example of the third buffer controlling method of FIG. 3 in the case of applying a packet switching device with two input communication channels and two output communication channels.

In FIG. 4, a switch 10 transmits the input packet to the output communication channel indicated by the routing data on the packet. A pair of input communication channels 12a, 12b, input packet to the switch. A pair of buffers 11a, 11b, are provided, corresponding to each of the input communication channels. A pair of output communication channels 13a, 13b, output the packet from the switch. A pair of packet storage means 110a, 110b, store data showing the order in which packets are received from certain input communication channels and appear on the input communication channels, and temporarily store the packets. A pair of packet storage data display means 111a, 111b, display packet storage data which has a status determined by the packets which are stored by the packet storage means. A pair of head packet output means 112a, 112b, output the head packet which are the oldest packet stored by the packet storage means. A pair of next candidate packet output means 113a, 113b, output the next candidate packets which satisfy the selection conditions indicated from external sources for the packets stored in the packet storage means. A transmission control means 14 receives a plurality of items of packet storage data displayed by the packet storage data display means, selects either the head packet output means or the next candidate packet output means for the respective buffers from the packet storage data received, and indicates the selection conditions used for the next candidate packet output means when the next candidate packet output means is selected. A packet transmission means 102 receives the packet output by the head packet output means or the next candidate packet output means selected by the transmission control means, determines the output communication channel for transmitting the packet from between the output communication channels accomodated in the switch, using the routing data attached to the packet, and transmits the packet.

Next, the action of the embodiment shown in FIG. 4 will be explained.

The two buffers provided to correspond to the input communication channels are referred to as buffer A and buffer B, and the two output communication channels are referred to as output communication channel C and output communication channel D. The following three types of data items are adopted for buffer status data. The packets stored in the buffers A, B are analyzed and the buffer storage data is indicated to the transmission control section.

(1) All packets stored in that buffer are for output communication channel C.

(2) All packets stored in that buffer are for output communication channel D.

(3) Packets stored in that buffer are for both output communication channel C and output communication channel D.

In the transmission control section, two buffers are controlled by combining the buffer status data for buffer A and buffer B according to the Table shown in FIG. 5. The method of selecting either the head packet output means or the next candidate packet output means and the method of determining the selection conditions are indicated by the Roman numerals shown in the columns of the Table of FIG. 5. The meanings of the Roman numerals in each column are as follows.

I: The buffer A or the buffer B is selected according to a certain probability distribution. The head packet output means in the selected buffer is selected, and no packet is output from the buffer which was not selected.

II: The head packet output means is selected by both the buffer A and buffer B.

III: In the buffer A the head packet output means is selected; in the buffer B the next candidate packet output means is selected. In the next candidate packet output means of the buffer B, routing data is provided as selection conditions for an output communication channel which differs from the output communication channel for the packet which is output by means of the head packet output means of the buffer A.

IV: In the buffer B the head packet output means is selected; in the buffer A the next candidate packet output means is selected. In the next candidate packet output means of the buffer A, routing data is provided as selection conditions for an output communication channel which differs from the output communication channel for the packet which is output by means of the head packet output means of the buffer B.

V: Selection is made according to the probability distribution of III or I.

When either one of the buffers is empty, the head packet output data means is selected from the buffer which is not empty.

Next, the design of the throughout of the packet switching device in a 2×2 switch which accommodates two output communication channels and two input communication channels which is the embodiment outlined above, in the case where the output communication channel intended for the packet transported on the input communication channel is decided at random, will be explained. In order to get the maximum throughput, there are normally n packets existing in a buffer provided to correspond with two input communication channels. These provide a buffer of n packets in length corresponding to two input communication channels. This buffer is always just short of overflowing.

The buffers provided to correspond to two input communication channels are referred to as the buffer A and the buffer B, and the two output communication channels are referred to as the output communication channels C and the output communication channels D. The packets housed in the buffer A are the packets to be transmitted from the output communication channels C or the output communication channels D, so that the status Na of the buffer A is defined as the number of packets existing in the buffer A intended for the output communication channels C. In addition, the status Nb of the buffer B, in the same way as Na, is the number of packets existing in the buffer B intended for the output communication channels C. This being the case, the status of the packet switching device under consideration can be defined as a combination of the status Na of the buffer A and the status Nb of the buffer B. This can be represented as [Na, Nb]. Because Na, Nb have respectively n+1 cases, the status of the packet switching device [Na, Nb] have $(n+1)^2$ cases. Concerning this status [Na, Nb], based on the conditions [Na1, Nb1] which is a status of the packet switching device, performing a status transition, on enumerating the conditional probabilities ([Na2, Nb2] [Na1, Nb2]) associated with the conditions which result in the status [Na2, Nb2], in the packet switching device now under consideration, the following results are obtained.

Here, for the sake of simplification, for the probability distribution representing the action shown by the Roman numerals I and V in the buffer control method in FIG. 5, the degree of probability becomes 0.5.

The switching action according to such probabilities can be realized, for example, by providing a flip-flop for the transmission control means in order to make selection by the status of the flip-flop and then the flip-flop is toggled. This is a very easy method.

| | | | |
|---|---|---|---|
| P([0,0] | [0,0]) = 0.5 | P([n,n] | [n,n]) = 0.5 |
| P([0,1] | [0,0]) = 0.25 | P([n,n−1] | [n,n]) = 0.25 |
| P([1,0] | [0,0]) = 0.25 | P([n−1,n] | [n,n]) = 0.25 |
| P([0,n] | [0,0]) = 0.25 | P([n,0] | [n,0]) = 0.25 |
| P([1,0] | [0,n]) = 0.25 | P([n,1] | [n,0]) = 0.25 |
| P([0,n−1] | [0,n]) = 0.25 | P([n−1,0] | [n,0]) = 0.25 |
| P([1,n−1] | [0,n]) = 0.25 | P([n−1,1] | [n,0]) = 0.25 |
| P([0,i] | [0,i]) = 0.25 | P([j,0] | [j,0]) = 0.25 |
| P([1,i] | [0,j]) = 0.25 | P([j,1] | [j,0]) = 0.25 |
| P([0,i−1] | [0,i]) = 0.25 | P([j−1,0] | [j,0]) = 0.25 |
| P([1,i−1] | [0,i]) = 0.25 | P([j−1,1] | [j,0]) = 0.25 |
| P([n,i] | [n,i]) = 0.25 | P([j,n] | [j,n]) = 0.25 |
| P([n−1,i] | [n,i]) = 0.25 | P([j,n−1] | [j,n]) = 0.25 |
| P([n,i+1] | [n,i]) = 0.25 | P([j+1,n] | [j,n]) = 0.25 |
| P([n−1,i+1] | [n,i]) = 0.25 | P([j+1,n−1] | [j,n]) = 0.25 |
| P([i,j] | [i,j]) = 0.25 | | |
| P([i,j−1] | [i,j]) = 0.125 | | |
| P([i,j+1] | [i,j]) = 0.125 | | |
| P([i−1, j] | [i,j]) = 0.125 | | |
| P([i+1,j] | [i,j]) = 0.125 | | |
| P([i+1,j−1] | [i,j]) = 0.125 | | |
| P([i−1,j+1] | [i,j]) = 0.125 | | |
| (where, i, j ≠ 0,n) | | | |

Using the above equations, the status transition array can be drawn up for the optional buffer length n, and the steady-state probability Po([Na, Nb]), which is the steady state of the packet switching device [Na, Nb], can be obtained.

The idle probability is defined as the probability of output communication channels being idle in the steady state. In the packet switching device now under consideration, the idle probability for the output communication channel C at steady state is the probability Po ([0, 0]) in the status [0, 0] for the packet switching device at steady state. Using the abovementioned equations, the specific values of Po([0, 0]) obtained for various values of n are as shown in FIG. 6.

Figure 7:
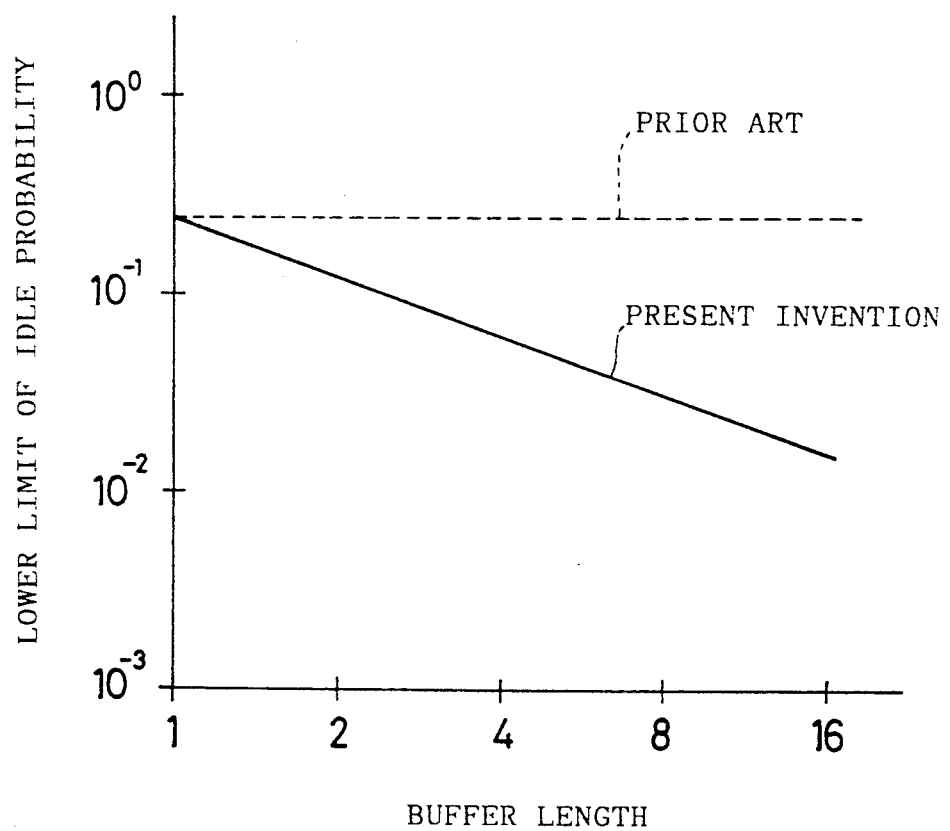
FIG. 7 is a diagram showing the relationship between the lower limit of the probability of non-use of the packet switching device of the conventional method and that of the present invention and the length of the buffer.

The idle probability for the output communication channel at steady state is the probability Po ([n, n]) in the status [n, n] for the packet switching device at steady state. From the symmetry of the abovementioned equations, it can be clearly seen that Po([0, 0]) and Po([n, n]) are the same. Accordingly, under certain conditions, the idle probability of certain output communication channels is the same as the specific value of Po([n, n]) above. Further, the case where the buffer is always close to overflowing was considered, relative to Po([0, 0]). Accordingly, it is understood that the lower limit of the idle probability of a certain output communication channel where the optional number of packets stored in the buffer is n or less, gives the specific value of Po([0, 0]). FIG. 7 is a graph showing the relationship between the lower limit of the idle probability of the output communication channels stored in the packet switching device of the present invention and the buffer length. In this graph, the X-axis is the buffer length and the Y-axis is the idle probability. A graph showing the relationship between the lower limit of the idle probability of the output communication channel accommodated in a conventional packet switching device and the length of the buffer is also shown in FIG. 7 for comparative purposes. The lower limit of the idle probability of the output communication channel accommodated in a conventional packet switching device has the same value as the value in the case where n=1 in the above equations, because the buffer does not have the function of searching for and outputting a packet for an idle output communication channel.

In the case where a certain output communication channel is not an idle output communication channel, a packet is output to that channel. Accordingly, the maximum throughput can be shown as $$1 - Po([0.0])$$

and when n=16 this maximum throughput becomes about 0.9843, thus achieving a technical advancement.

From the above analysis, in the case where the Roman numeral I is shown, among the buffer control methods by combining the buffer status data for the embodiment of the packet switching device of the present invention shown in FIG. 5, when the packet storage means of an unselected buffer is full and the packet cannot be stored, the arriving packet is discarded. Accordingly, to avoid the discarding of the arriving packet, if a packet from among the packets stored in the packet storage device is discarded at random, the throughput of the packet switching device can be further increased.

The packet switching device of the present invention can be constructed as a single switch, or it can be constructed as a composite switch, with a plurality of single switches joined together to form a Banyan network or the like. When such a composite switch is used as a packet switching device there is no change whatever in the effectiveness of the present invention. At that time it is more effective if the composite switch contains a well known self routing function.

In a composite switch constructed by joining a plurality of single switches, there is no change in the effectiveness of the present invention if it used so that the packet transmission speed in a single switch and the packet transmission speed between the single switches in a composite switch is greater than the input and output speed of the packet to the composite switch unit. When the packet route within the composite switch is decided deterministically and the packet route is further concentrated in the communication links between the individual switches in a certain composite switch, this method is effective in improving the discard ratio. When this method is used, if the packet transmission speed within the composite switch exceeds the output speed of the packet from the composite switch, it is necessary to have a buffer for temporarily storing the packet at the point where the packet is output from the composite switch.

The present invention is not only applicable for construction of a data communication network, but has possible application in a parallel computer system as a main processing unit for speeding up calculations.

In order to device the packet switching device of the present embodiment, the buffer has to possess a function to output the packet that is oldest among candidate packets to be outputted. This function can be realized by a buffer which can output a packet having a certain priority by regarding, as priority information, information for assigning a communication channel to a packet.

Figure 1B:
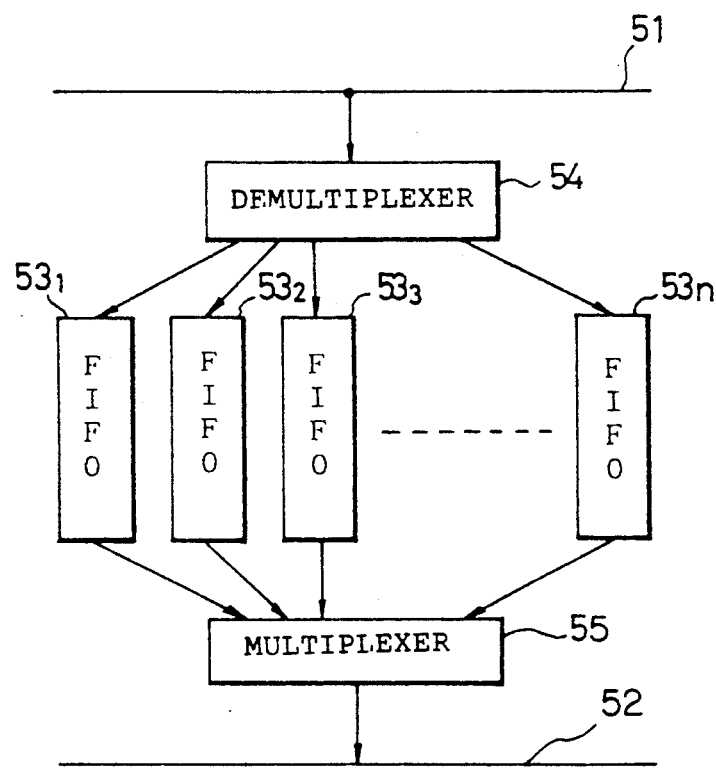
FIG. 1(b) is a block diagram showing a conventional buffer.

The prior art structure of buffers of this kind is as shown in FIG. 1(B).

Specifically, a plurality of FIFO (First in First out) buffers 531, 532 . . . 53n provided between an input communication channel 12 and a switch 10 are buffers which house packets of different degrees of priority. This degree of priority is carried as data by the packet itself and is attached at the time the packet is stored in the buffer, or it can be attached to correspond with packets of various shapes provided as data for managing a memory means or the like. A demultiplexer 54 which has accepted a packet intended for transmission from a first communication channel 51 distributes the in-coming packets in the special FIFO buffers 53 corresponding to their priorities. A multiplexer 55 selects the buffer 53 with the certain priority, usually the highest priority from among the FIFO buffers 53 storing the packets, removes the packet from the buffer 53, and outputs it to the second communication channel 52.

In this type of system, the packets are stored in the FIFO buffer 53 in order of priority, and when the multiplexer 55 outputs the packet, it takes out the packet from the FIFO buffer 53 which is alloted the certain priority among the FIFO buffers 53 storing the packets.

With a conventional communication buffer device provided with the FIFO buffers by priority, the priorities of the packets which are actually transmitted are inclined toward a certain priority there are various numbers of packets which are stored in the FIFO buffers 53, and there is the problem that the officiency of utilization of the memory regions of the FIFO buffer 53 is reduced.

In this way, with the conventional communication buffer device which effectuates a priority control system for buffers of every degree of priority, there is the problem that the efficiency of utilization of the memory area of the buffer is poor.

How this problem is solved by the present invention will be apparent specifically by the followinng description.

Following is an explanation of one example of a buffer used in a 2×2 switch which is one embodiment of the present invention.

Figure 8A:
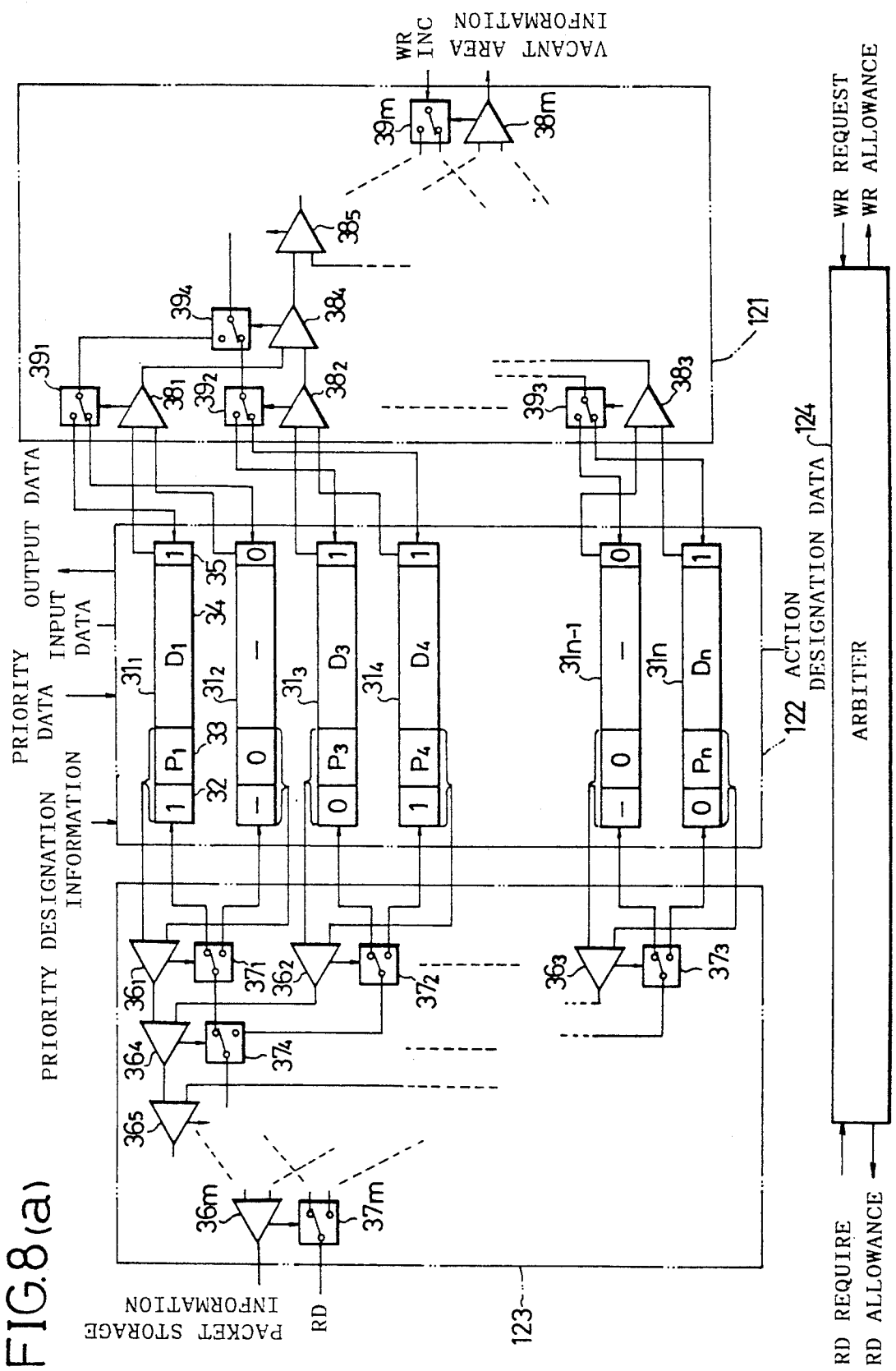

FIG. 8(a) is a block diagram showing the configuration of a buffer used in one embodiment of the present invention. The buffer comprises an input register selection circuit 121 for inputting a packet to a register array 122; the register array 122 which in turn comprises a plurality of registers 311, 312, -31n for storing a packet which has been input from a packet input device; an output data selection circuit 123 which determines the packet for outputting from among the packets stored in the register array 122; and an arbiter 124 which mediates between the input and output requirements in the register array 122. The function assigned to the packet storage means is provided by the input register selection circuit 121, the register array 122, and the arbiter 124. The functions assigned to the head packet output means, next candidate packet output means, packet storage data display means are provided by the output data selection circuit 123.

The registers 31$i$ ($i=1$ to n) of the register array 122 comprise a priority data section 32, an arrival order date section 33, a data section 34, and a vacant area flag 35. The priority data section 32 stores the priority for deciding the packet to be output. The priority in this embodiment of the present invention is routing data, or a portion thereof, for designating the route for the packet.

When this 2×2 switch is utilized for a switching network, bits required for accomplishment of the self-routing function are selected among from routing data of the packet. The input packet is housed in the data section 34. Also, in the arrival order data section 33, the data stored in the data section 34 for each register 311, shows the order of arrival at the register array 122, and the arrival order data is stored. The vacant area flag 35 shows whether or not a packet is accommodated in the register 31$i$ containing the vacant area flag.

Next, the action of the buffer shown in FIG. 8(a) will be explained using the same diagram.

When a packet is input to the buffer, the following action takes place.

First, reference is made to the vacant area flag to confirm if there are any registers in the register array in which, packets are not being stored. After that a WR arrival request is sent to the arbiter and WR approval is awaited. When WR arroval is returned, a desired packet is inputted and prior data is given routing data of the packet or a portion thereof. A pulse is imparted to the WR and INC simultaneously, and from this action the packet is input to the buffer.

Figure 8C:
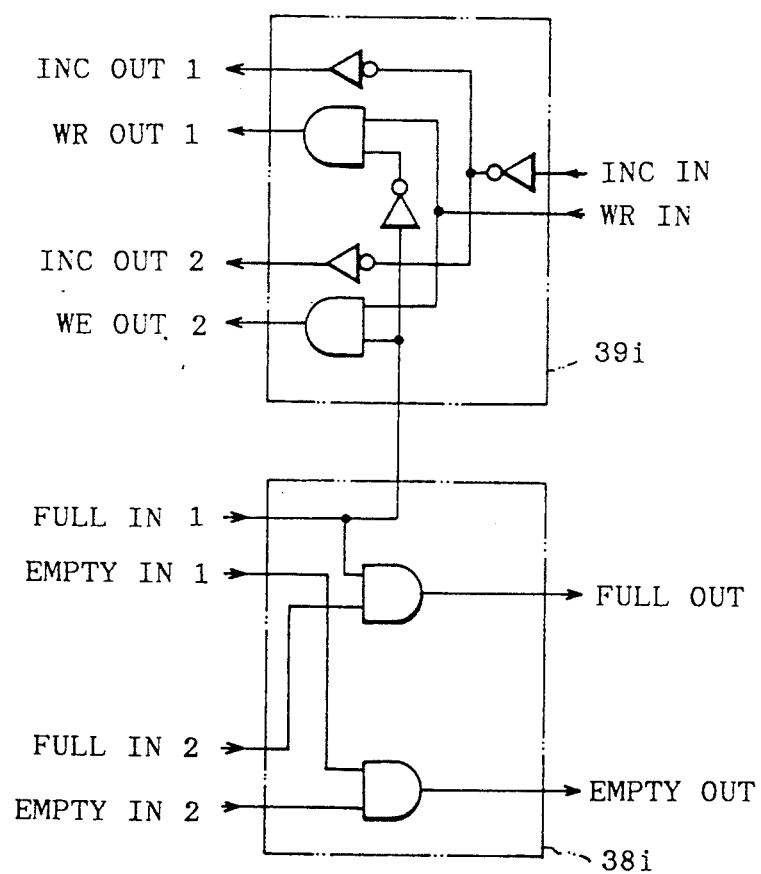

The input register selection circuit comprises a plurality of vacant area collection circuits 38$i$ and associated WR/INC pulse switch 39$i$ in a binary tree configuration. The vacant area data collection circuit 38$i$ and the WR/INC pulse switch 39$i$ have the configuration, for example, as shown in FIG. 8(c). The vacant area data collection circuit 38$i$ initiates and outputs the following signals:

Empty In 1, Empty In 2 signals indicating that all resisters connected to its son vacant area data collection circuit are an empty;

Full In 1, Full In 2 signals indicating that all registers are all storing packets;

Empty Out signal indicating that the vacant area collection circuit register group connected to it are all empty;

Full Out signal indicating that register groups connected to it are all storing packets.

As a result, the binary tree root of the vacant area collection circuit can detect the register array status, specifically, the status in which the resisters are all empty, or the status in which all the registers are storing packets.

On the other hand, the WR/INC pulse switch is controlled by the corresponding vacant area data collection circuit, and the WR pulse is activated in the direction of registers not storing packets so that INC pulse are given to the registers.

Each register 31$i$ making up the register array has a configuration as indicated in FIG. 8(b). Input data originating externally is provided as the input to a register 342 corresponding to the data section 34, and priority data is provided to a flip-flop 321 corresponding to the priority data section 32. Also, the WR output from the WR/INC pulse switch 39$i$ in the leaf side of the input register selection circuit is provided to the register 342 block and the flip-flop 321 block, and the data provided on the positive edge of the WR pulse is sampled.

The CLR terminal of a flip-flop 351 is the reset terminal for the flip-flop 351 by level activation. This flip-flop corresponds to the vacant area flag 35. When it is reset it indicates that a packet is stored, and when set, that a packet is not stored. The circuit is constructed so that the same reset action is performed as when the WR pulse is output. The output terminal of the flip-flop is connected to Empty In 1 and Full In 1 or Full In 2 and Empty In 2 in the leaf side of the input register selection circuit and is used to output the status of the register array.

If a packet is stored in that register, a counter 331 corresponding to the arrival order data section 33 is incremented at the negative edge of the INC signal. Also, this counter is cleared when the packet is output. By this action, control of the arrival order of the packets stored in the register array 122 is managed.

Packet Strage Information which is data in the packets stored in the buffer, is displayed externally in the following manner.

Figure 8D:
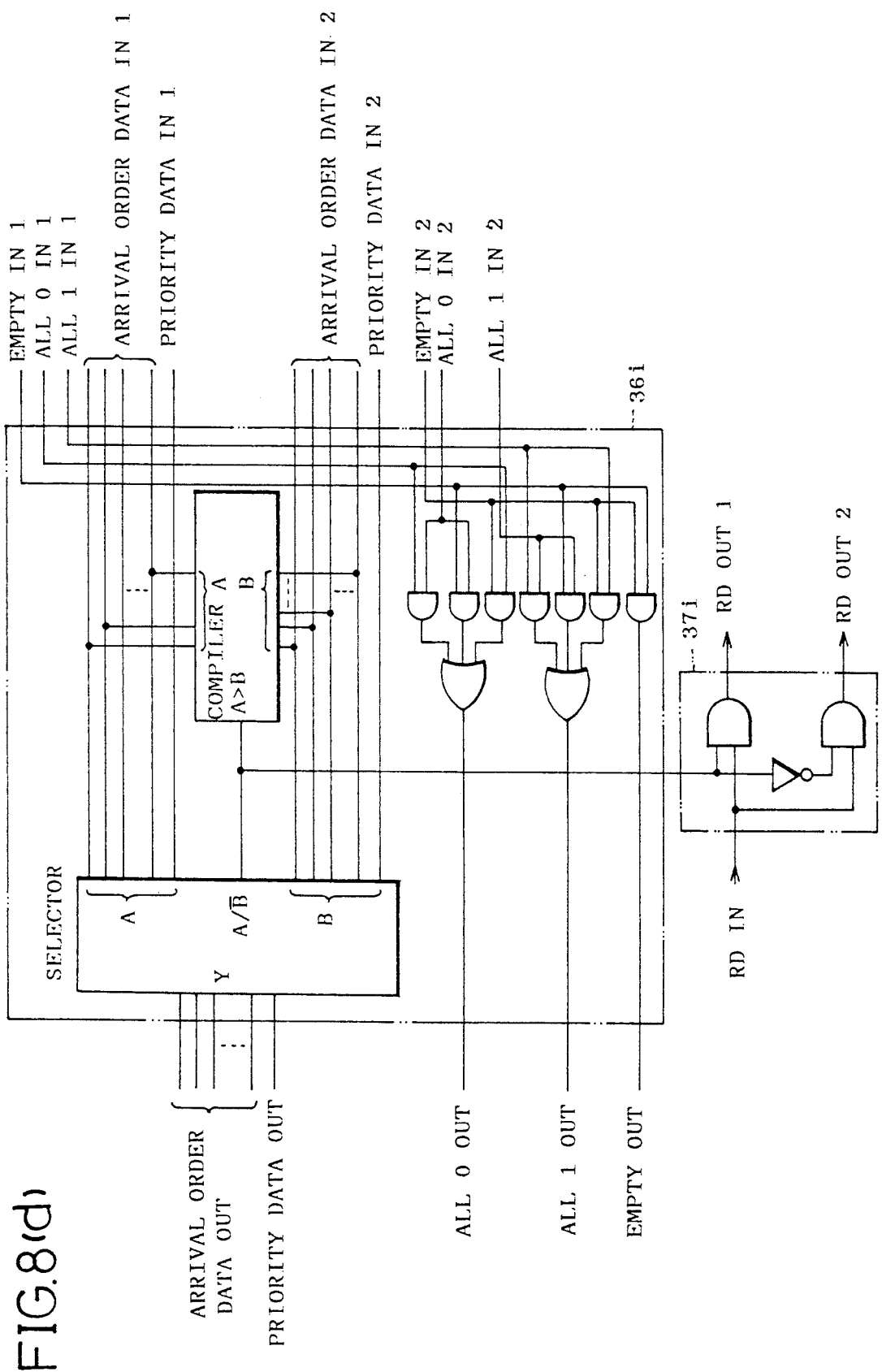

The output data selection circuit has a structure of binary tree connection of packet storage data collection circuits 36$i$ and associated RD pulse switches 37$i$. The packet storage data collection circuit 36$i$ and the RD pulse switch 37$i$ have a configuration such as that shown in FIG. 8(d). The packet storage data collection circuit 36$i$ compares two pieces of arrival order data input from the leaf side. The larger of the two is output to the root side together with priority data provided simultaneously. This is referenced together with the input signals Empty in 1, A110 In1, A111 In1, Empty In 2, A110 In2, A111 In2, and outputs signals Empty Out, All 0 Out, All 1 Out. Empty Out indicates that the registers connected to that packet storage data collection circuit are all vacant. A110 Out indicates that if the registers connected to that packet storage data collection circuit are storing packets, the priority data which those packets hold must be 0; A111 Out indicates that if the registors connected to that packet storage data collection circuit are storing packets, the priority data which those packets hold must be 1. As a result, the data for the packet stored in the register array is output from the root of the output data selection circuit. At the same time, among the packets stored in the register array, the priority data of the largest arrival order data is output from the root of the output data selection circuit. At this time, the RD pulse switch receives the control of the corresponding packet storage data collection circuit, and the received RD pulse is activated so that it can be conducted in the direction providing the largest between the arrival order data.

When the packet is output from the buffer, the following actions are performed.

First, an explanation will be given for the case where the packet which has been stored the longest in the register array is output.

Action designated data signal is set to 1. All the AND gates in an AND gate array 332 are opened, and the arrival order data of the all counter 331 included in the register array is provided to the output data selection circuit. From this root, the priority data for the packet which has been stored the longest in the registor array and the arrival order data for the packet are output.

Next, the packet storage data is referenced to confirm that the packet is stored in the register array. Then, an RD request is sent to the arbiter and RD allowance is awaited. When RD allowance is returned an RD pulse is provided to the root of the output packet selection circuit. Then the RD pulse is conducted to the register in the register array which has the largest arrival order data.

At the register which receives the RD pulse, a three-state buffer 341 is activated, and the data stored in the register 342 corresponding to the data section is output externally.

In addition, the counter 331 is cleared by the RD pulse, and the flip-flop 351 is set at the negative edge of the RD pulse.

Next, an explanation will be given for the case where the oldest packet stored in an array among packets having a certain priority, is output.

In this case, in the priority designated data when the priority held by the packet which it is desired to output is provided, at the same time the action designated data is set to 0. Then, the data provided to the priority designated data and the priority for the packet which the register has, the AND gate array opens, and the arrival order data of the counter 331 included in the register array is provided to the output data selection circuit. When the flip-flop 321 has no data or the AND gate does not open, all zero bit pattern is provided to the output data selection circuit. As a result, the arrival order data of the desired packet only is provided to the output data selection circuit. After this, by carrying out the above-mentioned packet output procedures, in a packet having a certain priority, the packet stored in the register array the longest can be output.

With the buffer explained in this embodiment, the input and output of the packet cannot be set at the same time. Accordingly, it is necessary to have an arbiter to mediate the WR requests and the RD requests. The structure of this arbiter is well known to one skilled in the art. The action timing of the buffer is shown in FIG. 8(a).

It is possible to provide the necessary buffer for a packet switch such as the 2×2 packet switch which is one embodiment of the present invention, as explained above. With this 2×2 packet switch, in order to improve the throughput of the switch, priority control is carried out by means of the packet's routing destination, and therefore there may be temporarily stored packets not to be output for a long time, and the waiting time thereof may become large depending on the packet routing destination being input from an external source. In order to eliminate this possibility, when a threshold value, for which the arrival order data has been previously determined, is exceeded, that packet may be output on a priority basis. When 1 is given as action designated data, and when the arrival order data which is output from the root of the output data selection circuit exceeds the threshold value, the destination routing of the cell stored in the buffer can be provided by handling all the head packets the same as this. In order to perform this action, the bit length of the counter 331 should be larger than $\log N + 2$ [bits] (where N is the number of packets which can be stored in the buffer). In addition, it does not matter if the packet which exceeds the threshold value in which the arrival order data is previously set is discarded.

Various modifications will become possible for those skilled in the art after receiving the teachings of the present disclosure without departing from the scope thereof.

What is claimed is:

1. A packet switching device which transmits data packets from a plurality of input communication channels to a plurality of output communication channels, comprising:
   (a) a switch which continuously switches between an input communication device and an output communication device;
   (b) a plurality of buffers which temporarily store the data packets transmitted from the input communication channels, then transmits the stored data packets to the switch, the plurality of buffers in one-to-one correspondence with the input communication channels;
   (c) a detection unit which detects a packet storage status of each buffer; and
   (d) a transmission control means for controlling the transmission status from the plurality of buffers to the switch so that a packet is selected to be transmitted from a buffer to the output communication device by an algorithm which uses the packet storage status of the buffer to select an idle communication channel on which to transmit the packet.

2. The packet switching device of claim 1 wherein each buffer is provided with a head packet output unit which outputs a packet stored in the buffer the longest.

3. The packet switching device of claim 2 wherein each buffer is provided with a next candidate packet output unit which outputs, by means of the transmission control means, a packet stored in the buffer the longest among packets with priority.

4. The packet switching device of claim 1 wherein each buffer is provided with an input register selection circuit which detects the storage status of registers making up the buffer, and stores a packet from an input communication channel in a vacant register.

5. The packet switching device of claim 1 accommodating two input communication channels and two output communication channels.

6. The packet switching device of claim 1 wherein each buffer is provided with a plurality of registers, and the packet is stored in a suitable vacant register together with priority data.

7. The packet switching device of claim 1 wherein the packet is also stored in a register together with data which indicated the arrival order of the packet.

8. The packet switching device of claim 1 further comprising a register which includes
 a region which stores priority data;
 a region which stores arrival order data for the packet; and
 a region which stores data showing whether or not a packet is stored in the register.

9. A packet switching device having a plurality of input communication channels and a plurality of output communication channels for transmitting a packet from the input communication channels to the output communication channels in accordance with a route data in the packet, comprising:
 (a) buffers provided in one-to-one correspondence to the input communication channels to temporarily store a packet transmitted from the input communication channels, to display buffer status data in accordance with a combination of the route data in packets stored respectively in the buffers, and to output the packet to the output communication channel of which is allocated by an indication;
 (b) a switch loading the packet from the buffers to the designated output communication channel; and
 (c) transmission control means for receiving the buffer status data displayed by the buffers and for providing to each of the buffers an allocation of output communication channels, determined by a combination of buffer status data from each of the buffers, the allocation made using a prescribed table.

10. The packet switching device as claimed in claim 9, wherein the packet switching device has two input communication channels A and B and two output communication channels C and D.

11. The packet switching device as claimed in claim 10, wherein the buffer status data displayed by each of the buffers indicates one of the status E that the buffer is empty, status F that all of the packets stored in the buffer are to be transmitted to the output communication channel C, status G that all of the packets stored in the buffer are to be transmitted to the output communication channel D, and status H that the packets stored in the buffer are to be transmitted to the output communication channel C and the output communication channel D.

12. The packet switching device as claimed in claim 11, wherein the transmission control means utilizes buffer status data displayed by each of the buffers and when a buffer has status H, controls the buffer such that one of the packets for the output communication channel C or the packets for the output communication channel D is outputted.

13. A packet switching device comprising:
 a 2×2 switch having two input terminals connected to two input lines and two output terminals connected to two output lines and transmitting a packet inputted from one of said input terminals selectively to at least one of said output terminals in accordance with destination information given to each packet indicative of which output line the packet is to be transmitted;
 two buffers connected between said two input lines and said input terminals of said switch for temporarily storing and selectively outputting packets inputted from said input lines, each buffer generating information indicating that the packets currently stored therein are destined only for one of said output lines, only for the other of said output lines or for both of said output lines; and
 an arbiter connected to said buffers for controlling said buffers to output appropriate packets to said switch in accordance with said information.

14. The device of claim 13 wherein the information generated by said buffer comprises:
 a first signal indicative that all the packets currently stored therein are destined for one of said output lines;
 a second signal indicative that all the packets currently stored therein are destined for the other of said output lines; and
 a third signal indicative that no packets are currently stored therein.

15. The device of claim 14 wherein said buffer comprises:
 a plurality of registers, each register being capable of storing one packet;
 an input register selection circuit connected to said registers for generating information reporting if all of said registers have stored packets and an output register selection circuit for generating said first, second or third signal.

16. The device of claim 15 wherein each register is provided with a counter which is reset when a packet is stored in the register and counts up when a packet is stored in any register belonging to the buffer having said register.

17. The device of claim 16 wherein said output register selection circuit compares counted numbers of two of said counters and outputs a largest number of the counted numbers on the basis of the comparison.

18. The device of claim 17 wherein said comparison is carried out with respect to the all of said counters.

19. The device of claim 17 wherein said comparison is carried out with respect to the counters belonging to said registers storing packets destined for selected one of said output lines.

20. The device of claim 16 wherein said output register selection circuit receives a read out signal from said arbiter and outputs the read out signal to the register corresponding to the counter that counts a largest number.

* * * * *